3,342,677
ANTIBACTERIAL COMPOSITIONS COMPRISING
ALPHA-AMINOTHENYLPENICILLINS
Lee C. Cheney, Fayetteville, N.Y., and Yvon G. Perron, Ville d'Anjou, Quebec, Canada, assignors to Bristol-Myers Company, New York, N.Y., a corporation of Delaware
No Drawing. Filed July 5, 1963, Ser. No. 293,185
4 Claims. (Cl. 167—65)

This invention relates to new synethetic compounds of value as antibacterial agents, as nutritional supplements in animal feeds, as agents for the treatment of mastitis in cattle and as therapeutic agents in poultry and animals, including man, in the treatment especially of infectious diseases caused by Gram-positive and Gram-negative bacteria and, more particularly, relates to 6-[α-amino-α-(2- or 3-thienyl)acetamido]penicillanic acid and the pharmaceutically acceptable salts thereof.

This application is a continuation-in-part of our prior copending application Serial No. 190,781, filed April 27, 1962, now abandoned.

Antibacterial agents such as benzylpenicillin have proved highly effective in the past in the therapy of infections due to Gram-positive bacteria but such agents suffer from the serious drawbacks of being unstable in aqueous acid, e.g. upon oral administration, and of being ineffective against numerous strains of bacteria, e.g. most Gram-negative bacteria. The compounds of the present invention are particularly useful in that they possess potent antibacterial activity against both Gram-positive and Gram-negative bacteria upon either parenteral or oral administration and also exhibit resistance to destruction by acid and penicillinase. The compounds of the present invention are especially effective in the treatment of infections caused by Gram-negative organisms such as *Klebsiella pneumoniae* and *Salmonella enteritidis*.

There is provided, according to the present invention, compounds having the formula (I) 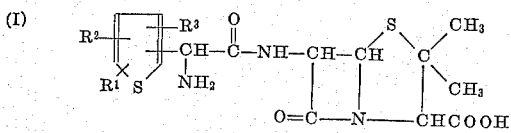

wherein $R^1$, $R^2$ and $R^3$ are each a member selected from the group consisting of hydrogen, chloro, bromo, fluoro, iodo, nitro, (lower)alkyl, (lower)alkoxy, (lower)alkylthio, di(lower)alkylamino, (lower)alkanoylamino, (lower) alkanoyl, (lower)alkylsulfonyl, cycloalkyl radicals having from 5 to 7 carbon atoms inclusive, cycloalkoxy radicals having from 5 to 7 carbon atoms inclusive, and radicals of the formulae (II) 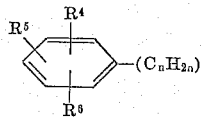

and (III) 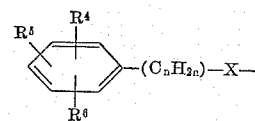

wherein *n* is a whole integer from 0 to 6 inclusive, wherein X is selected from the group consisting of sulfur and oxygen, and wherein $R^4$, $R^5$ and $R^6$ are each a member selected from the group consisting of hydrogen, chloro, bromo, fluoro, iodo, nitro, (lower)alkyl, (lower)alkoxy, (lower)alkylthio, di(lower)alkylamino, (lower)alkanoyl- amino, (lower)alkanoyl, (lower) alkylsulfonyl, cycloalkyl radicals having from 5 to 7 carbon atoms inclusive, cycloalkoxy radicals having from 5 to 7 carbon atoms inclusive, phenyl, benzyl, phenethyl and trifluoromethyl, and the pharmaceutically acceptable nontoxic carboxylic acid salts thereof.

Such pharmaceutically acceptable salts include the nontoxic metallic salts such as sodium, potassium, calcium and aluminum, the ammonium salt and substituted ammonium salts, e.g. salts of such nontoxic amines as trialkylamines, including triethylamine, procaine, dibenzylamine, N - benzyl - beta - phenethylamine, 1-ephenamine, N,N' - dibenzylethylenediamine, dehydroabietylamine, N,N'-bis-dehydroabietylethylenediamine, N-(lower)alkylpiperidine (e.g., N-ethylpiperidine) and other amines which have been used to form salts with benzylpenicillin; and the pharmaceutically acceptable acid addition salts thereof (i.e. the amine salts) including the mineral acid addition salts such as the hydrochloride, hydrobromide, hydroiodide, sulfate, sulfonate, sulfamate, and phosphate and the organic acid addition salts such as the maleate, acetate, citrate, oxalate, succinate, benzoate, tartrate, fumarate, malate, mandelate, ascorbate and the like. Also included within the scope of the present invention are easily hydrolyzed esters or amides which are converted to the free acid form by chemical or enzymatic hydrolysis. The term "(lower)alkyl" as used herein means both straight and branched chain aliphatic hydrocarbon radicals having from 1 to 6 carbon atoms such as methyl, ethyl, propyl, isopropyl, butyl, isobutyl, t-butyl, amyl, hexyl, etc. Similarly, where the term "(lower)" is used as part of the description of another group, e.g. "(lower) alkoxy," it refers to the alkyl portion of such group which is therefore as described above in connection with "(lower)alkyl."

To illustrate groups including (lower)alkyl groups, it is pointed out that (lower)alkoxy includes such radicals as methoxy, ethoxy, isopropoxy, etc.; (lower)alkylthio includes methylthio, ethylthio, butylthio, etc.; (lower) alkanoyl includes acetyl, propionyl, butyryl, etc.; (lower) alkylsulfonyl includes methylsulfonyl, ethylsulfonyl, hexylsulfonyl, etc.; di(lower)alkylamino includes dimethylamino, diethylamino, ethylmethylamino, etc.

The α-carbon atom of the acyl group (to which the α-amino group is attached) is an asymmetric carbon atom and the compounds of this invention can therefore exist in two optically active isomeric forms (the d- and l-diastereoisomers), as well as in a mixture of the two optically active forms; all such isomeric forms of the compounds are included within the scope of the present invention.

It should be noted in connection with the foregoing consideration of the diastereoisomers of this invention that many isomers other than the two caused by the asymmetric carbon of the side chain are possible due to the presence of asymmetric carbon atoms in the 6-aminopenicillanic acid nucleus. Such additional isomers, however, are not presently significant since 6-aminopenicillanic acid which is the product of fermentation processes is consistently of one configuration; such 6-aminopenicillanic acid is presently used in the production of the compounds of this invention.

A preferred group of compounds of Formula I are those in which at least one of $R^1$, $R^2$ and $R^3$ is hydrogen; thus the thienyl moiety of such preferred compounds can be represented by the formula (IV) 

wherein R¹ and R² each have the meaning set forth above. Of these preferred compounds, a preferred subgroup is that wherein R¹ and R² are selected from the group consisting of hydrogen, (lower)alkoxy, chloro and radicals of Formulae II and III above, wherein R⁴, R⁵ and R⁶ are selected from the group consisting of hydrogen, (lower)alkyl, (lower)alkoxy and chloro and wherein S is sulfur and the heterocyclic moiety is attached at its 2-position to the acetamido grouping (i.e. the heterocyclic moiety is a substituted or unsubstituted 2-thienyl group).

The penicillins of Formula I may be prepared by the reaction of 6-aminopenicillanic acid, preferably in the form of a neutral salt such as the sodium, potassium or triethylamine salt, with an α-(2- or 3-thienyl)-α-amino acid chloride having the formula (V) 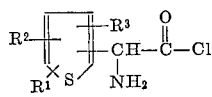

wherein R¹, R² and R³ each has the meaning set forth above, or its functional equivalent as an acylating agent for a primary amino group. Such equivalents include the corresponding acid bromides, acid anhydrides and mixed anhydrides with other carboxylic acids, including monoesters and particularly lower aliphatic esters, of carbonic acid.

In addition, an acid azide or an active ester or thioester (e.g. with p-nitrophenyl, thiophenyl, thioacetic acid), may be used or the free acid itself may be coupled with 6-aminopenicillanic acid by the use of enzymes or of a carbodiimide reagent (cf. Sheehan and Hess, J. Amer. Chem. Soc., 77, 1067 [1955]).

Another generally useful equivalent of the acid chloride is a corresponding azolide, i.e. an amide of the corresponding acid whose amide nitrogen is a member of a quasi-aromatic five-membered ring containing at least two nitrogen atoms, i.e. imidazole, pyrazole, the triazoles, benzimidazole, benzotriazole and their substituted derivatives. As an example of the general method for the preparation of an azolide, N,N'-carbonyldiimidazole is reacted with a carboxylic acid in equimolar proportions at room temperature in tetrahydrofuran, chloroform, dimethylformamide or a similar inert solvent to form the carboxylic acid imidazolide in practically quantitative yield with liberation of carbon dioxide and one mole of imidazole. Dicarboxylic acids yield diimidazolides. The by-product, imidazole, precipitates and may be separated and the imidazolide isolated but this is not essential.

The penicillin may be formed by reaction of 6-aminopenicillanic acid with a chloride hydrochloride of the appropriate α-(2- or 3-thienyl)glycine. The thienyl substituted glycyl chloride hydrochloride may be formed by reacting 0.032 mole of the corresponding α-thienyl glycine, suspended in methylene chloride and cooled to below 0° C., with 0.048 mole of phosphorus pentachloride. The reaction mixture is stirred while maintaining a temperature of about 0° C. or below. Additional methylene chloride may be added to thin the mixture. A few drops (about 10) of dimethyl formamide are added to the mixture. The α-thienyl glycyl chloride hydrochloride forms as a precipitate and is recovered by filtration. About 0.028 mole of the product is then added to a solution of 0.019 mole of 6-aminopenicillanic acid in a mixture of acetone and water at a pH of 2-3 and maintained at a temperature of 0° C. or below. The solution is then stirred for a few minutes after completion of the addition of the chloride hydrochloride and the pH is adjusted to 4-5. The acetone is removed, the solution is filtered to remove any insoluble material and the filtrate is cooled to about 5° C., layered with about one-fourth volume of methyl isobutyl ketone and acidified to pH 2 while stirring the mixture. The methyl isobutyl ketone layer is separated and discarded. The aqueous layer is then cooled to about 0° C. and extracted with 0.012 mole of dioctyl sodium sulfosuccinate in methyl isobutyl ketone. The extract is filtered and neutralized to a pH of 5-6 at which point a precipitate of the desired 6-substituted penicillanic acid is formed.

The penicillin may also be prepared by reaction of 6-aminopenicillanic acid with N-carbobenzoxy α-(2- or 3-thienyl)-α-amino acetyl chloride having the general formula (VI) 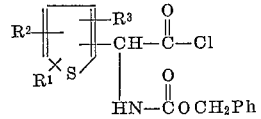

wherein R¹, R² and R³ each have the meaning set forth above, or its functional equivalent as an acylating agent for a primary amino group and thereafter removing the protecting group from the amino radical by hydrogenation under sufficiently mild conditions to avoid destruction of the penicillin nucleus. The protecting group,

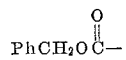

in the formula above may be replaced by other functionally equivalent protecting groups. Suitable protecting groups are of the general formula R″OCO where R″ is allyl, benzyl (as shown in the formula above), substituted benzyl, phenyl or substituted phenyl group, or the trityl group.

The methods for carrying out these reactions to produce a penicillin and the methods used to isolate the penicillins so produced are well-known in the art.

General methods for the preparation and purification of all of the penicillins of the present invention according to the mixed anhydride procedure and the acid chloride procedure are described and illustrated in U.S. Patents No. 2,941,995, 2,996,501 and 2,951,839.

The substituted α-(2- or 3-thienyl)-α-aminoacetic acids and the corresponding acetyl chlorides which may be used in the preparation of the compounds of the present invention may be prepared by a variety of synthetic methods which are common in the art. Most of these starting compounds are described in the prior art and many of them are commercially available. Detailed discussions of methods for the preparation of these starting materials are found in such reference works as the "Chemistry of Carbon Compounds," E. H. Rodd, editor, vol. IV^A, Elsevier Publishing Company (1957). The preparations of α-(2-thienyl)glycine and α-(3-thienyl)glycine are illustrative of such methods of preparation. These acids may be prepared according to the procedures described respectively in Ber., 19, 2115 (1886) and C.A. 53, 4249b.

In the exemplified process for the preparation of the compounds of Formula I above, the compounds are sometimes in aqueous solution in the form of their sodium or potassium salt. These compounds in the aqueous phase can then be converted to the free acid, preferably in the cold under a layer of ether by the addition of dilute mineral acid, e.g. 5 N $H_2SO_4$ to pH 2. The free acid can thus be extracted into a water-immiscible, neutral organic solvent such as ether, the extract washed with water quickly in the cold, if desired, and dried, as with the anhydrous $Na_2SO_4$ and the free acid recovered from the ethereal solution. The product in the ethereal extract in its free acid form can then be converted to any desired metal or amine salt, particularly the pharmaceutically acceptable nontoxic amine salts described above, by treatment with the appropriate base, e.g. a free amine such as procaine base or a solution of potassium 2-ethylhexanoate in dry n-butanol. These salts are usually insoluble in solvents such as ether and can be recovered in pure form by simple filtration.

The compounds of this invention, and particularly the 6[(—)-α-amino-(2- and 3-thienyl)acetamido]penicillanic acids, possess valuable antibacterial properties especially against Gram-negative bacteria such as against *Klebsiella pneumoniae* and *Salmonella enteritidis*. In this regard, the activities of these compoundse surpass the activity of the corresponding α-aminobenzylpenicillin. They may be administered orally in an amount of from about 10 to 30 mg./kg./day and preferably about 15 mg./kg./day in divided dosage, e.g. four times a day. It may be administered in dosage units containing, for exampe, 250 to 500 mg. of active ingredient in a suitable physiologically acceptable carrier. The dosage units may be in the form of liquid preparations such as solutions, dispersions or emulsions or in solid form such as capsules. The physiologically acceptable carrier may be any pharmaceutical carrier convenient for administration. The carrier may be a solid diluent such as gelatin, acacia, algenate, dextran, sodium carboxymethyl cellulose, polyvinyl pyrrolidone and the like.

The following examples will serve to illustrate this invention without limiting it thereto.

EXAMPLE 1

*Preparation of d,l-6-[α-amino-(2-thienyl)acetamido] penicillanic acid*

α-(thienyl)glycine [5.0 gm.; 0.032 mole, obtained by the method disclosed in Ber. 19, 2115 (1886)] is suspended in 35 ml. of methylene chloride and cooled to −7° C. with stirring and in the presence of calcium chloride dessicant. Phosphorus pentachloride (10 gm.; 0.048 mole) is added in one portion causing the temperature to rise to −3° C. The mixture is stirred for one-half hour while maintaining the temperature at −5° C. to 0° C., 15 ml. of methylene chloride is added, and stirring at −5° to 0° C. is continued for another one-half hour. Then, 10 drops of dimethyl formamide is added and another 20 ml. of methylene chloride is added to thin the mixture. The mixture is stirred rapidly and a purple slurry results. The product, d,l-α-(2-thienyl)-glycyl chloride hydrochloride, is collected by filtration under reduced pressure, washed three times with methylene chloride and dried in vacuo over $P_2O_5$. The weight of the product is 5.9 g. which represents a 72% yield.

The pH of a solution of 6-aminopenicillanic acid (4.1 gm.; 0.019 mole) in 80 ml. of water is adjusted to 6.3 by the addition of a 10% by weight solution of NaOH with stirring. The solution is then diluted with 340 ml. of acetone and cooled to −5° C. The pH of the solution is then adjusted quickly to 2.5 by the addition of 6 N HCl to the well-stirred mixture. To this solution is added d,l-α-(2-thienyl)-glycyl chloride hydrochloride (5.9 gm.; 0.028 mole) over a 20-minute period, the pH being kept at 2 to 2.5 by intermittent additions of 10% NaOH. The solution is stirred for 5 minutes after completion of the addition of the chloride hydrochloride and the pH is then adjusted to 4.8 by the addition of 10% NaOH. The acetone is removed under reduced pressure at 30–34° C. and the solution is filtered to remove insoluble material. The filtrate, having a pH of 4, is cooled to 5° C., adjusted to a pH of 7 by the addition of 10% NaOH, layered with 20 ml. of methyl isobutyl ketone and acidified to pH 2 with 20% $H_2SO_4$. Upon removal of the methyl isobutyl ketone layer, the color of the remaining aqueous layer clarifies. This aqueous layer is extracted again with 20 ml. of methyl isobutyl ketone and the extracts are discarded. The aqueous layer is then cooled to 0° C. and extracted at pH 2 with a 10% solution containing dioctyl sodium sulfosuccinate (5.3 gm.; 0.012 mole) in methyl isobutyl ketone. The methyl isobutyl ketone extract is separated by decanting, filtered through anhydrous $Na_2SO_4$ and concentrated slightly by evaporation under reduced pressure at 30° C. It is then neutralized to pH 5.3 by the addition of triethylamine. The solid product which forms is collected by filtration under reduced pressure, slurried with ether, refiltered and dried in vacuo over $P_2O_5$. The product, d,l-6-[α-amino(2-thienyl)acetamido]-penicillanic acid, is found to weigh 2.6 gm., to contain the β-lactam structure as shown by infrared analysis, to melt with decomposition at 186°–190° C., and to inhibit *Staph. aureus* Smith at a concentration of 0.2 mg./ml.

EXAMPLE 2

*Preparation of d,l-6-[α-amino-(3-thienyl)acetamido] penicillanic acid*

α-(3-thienyl)glycine (5.0 gm.; 0.032 mole, obtained by the method disclosed in C.A., 53, 4249b), is suspended in 35 ml. of methylene chloride and cooled to −7° C. with stirring and in the presence of calcium chloride dessicant. Phosphorus pentachloride (10 gm.; 0.048 mole) is added in one portion causing the temperature to rise to −3° C. The mixture is stirred for one-half hour while maintaining the temperature at −5° to 0° C., 15 ml. of methylene chloride is added, and stirring at −5° to 0° C. is continued for another one-half hour. Then, 10 drops of dimethyl formamide is added and another 20 ml. of methylene chloride is added to thin the mixture. The mixture is stirred rapidly and a purple slurry results. The product, d,l-α-(3-thienyl)glycyl chloride hydrochloride is collected by filtration under reduced pressure, washed three times with methylene chloride and dried in vacuo over $P_2O_5$. The weight of the product is 5.9 g. which represents a 72% yield.

The pH of a solution of 6-aminopenicillanic acid (4.1 gm.; 0.019 mole) in 80 ml. of water is adjusted to 6.3 by the addition of a 10% by weight solution of NaOH with stirring. The solution is then diluted with 340 ml. of acetone and cooled to −5° C. The pH of the solution is then adjusted quickly to 2.5 by the addition of 6 N HCl to the well-stirred mixture. To this solution is added d,l-α-(3-thienyl) glycyl chloride hydrochloride (5.9 gm.; 0.028 mole) over a 20 minute period, the pH being kept at 2 to 2.5 by intermittent additions of 10% NaOH. The solution is stirred for 5 minutes after completion of the addition of the chloride hydrochloride and the pH is then adjusted to 4.8 by the addition of 10% NaOH. The acetone is removed under reduced pressure at 30–34° C. and the solution is filtered to remove insoluble material. The filtrate, having a pH of 4, is cooled to 5° C., adjusted to a pH of 7 by the addition of 10% NaOH, layered with 20 ml. of methyl isobutyl ketone and acidified to pH 2 with 20% $H_2SO_4$. Upon removal of the methyl isobutyl ketone layer, the color of the remaining aqueous layer clarifies. This aqueous layer is extracted again with 20 ml. of methyl isobutyl ketone and the extracts are discarded. The aqueous layer is then cooled to 0° C. and extracted at pH 2 with a 10% solution of dioctyl sodium sulfosuccinate (5.3 gm.; 0.012 mole) in methyl isobutyl ketone. The methyl isobutyl ketone extract is separated by decanting, filtered through anhydrous $Na_2SO_4$ and concentrated slightly by evaporation under reduced pressure at 30° C. It is then neutralized to pH 5.3 by the addition of triethylamine. The solid product which forms is collected by filtration under reduced pressure, slurried with ether, refiltered and dried in vacuo over $P_2O_5$. The product, d,l-6-[α-amino-(3-thienyl)acetamido]penicillanic acid, is found to weigh 2.6 gm., to contain the β-lactam structure as shown by infrared analysis, and to inhibit *Staph. aureus* Smith at a concentration of 0.001% by weight.

EXAMPLE 3

*Preparation of 6-[α-amino(5-ethyl-2-thienyl)acetamido] penicillanic acid*

The procedure of Example 1 is repeated except that α-(5-ethyl-2-thienyl)glycine, prepared as described in C.A., 49, 8244c, is substituted for α-(2-thienylglycine). The product is found to contain the β-lactam structure as shown by infrared analysis and to inhibit *Staph. aureus* Smith at a concentration of 0.001% by weight.

EXAMPLE 4

*Preparation of 6-[α-amino(5-methyl-2-thienyl)acetamido] penicillanic acid*

The procedure of Example 1 is repeated except that α-(5-methyl-2-thienyl)glycine, prepared as described in C.A. 49, 8244d, is substituted for α-(2-thienylglycine). The product is found to contain the β-lactam structure as shown by infrared analysis and to inhibit *Staph. aureus* Smith at a concentration of 0.001% by weight.

EXAMPLE 5

*Preparation of 6-[α-amino(5-t-butyl-2-thienyl)acetamido] penicillanic acid*

The procedure of Example 1 is repeated except that α-(5-t-butyl-2-thienyl)glycine, prepared as described in C.A., 51, 4944b, is substituted for α-(2-thienylglycine). The product is found to contain the β-lactam structure as shown by infrared analysis and to inhibit *Staph. aureus* Smith at a concentration of 0.001% by weight.

EXAMPLE 6

*Preparation of 6-[α-amino(2,5-dimethyl-3-thienyl)acetamido]penicillanic acid*

The procedure of Example 2 is repeated except that α-(2,5-dimethyl-2-thienyl)glycine, prepared as described in C.A., 51, 4944a (1957), is substituted for α-(2-thienylglycine). The product is found to contain the β-lactam structure as shown by infrared analysis and to inhibit *Staph. aureus* Smith at a concentration of 0.001% by weight.

EXAMPLE 7

In the general procedure of Example 1, the α-(2-thienyl)glycine is replaced by 0.032 mole of α-(5-chloro-2-thienyl)glycine,
α-(5-methyl-2-thienyl)glycine,
α-(5-phenyl-3-chloro-2-thienyl)glycine,
α-(4-orthochlorophenyl-2-thienyl)glycine,
α-(5-nitrophenyl-2-thienyl)glycine,
α-(3,5-dimethyl-2-thienyl)glycine,
α-(5-cyclohexyl-2-thienyl)glycine,
α-(5-diethylamino-2-thienyl)glycine,
α-(4-methylsulfonyl-2-thienyl)glycine,
α-(3-ethylthio-2-thienyl)glycine, and
α-(4-cycloheptyloxy-2-thienyl)glycine, respectively, to produce 6 - [α - amino(5-chloro-2-thienyl)acetamido]penicillanic acid,
6 - [α - amino(5-methyl-2-thienyl)acetamido]penicillanic acid,
6 - [α - amino(5-phenyl-3-chloro-2-thienyl)acetamido] penicillanic acid,
6 - [α - amino(4-orthochlorophenyl-2-thienyl)acetamido] penicillanic acid,
6 - [α - amino(5-nitrophenyl-2-thienyl)acetamido]penicillanic acid,
6 - [α - amino(3,5-dimethyl-2-thienyl)acetamido]penicillanic acid,
6 - [α - amino(5-cyclohexyl-2-thienyl)acetamido]penicillanic acid,
6 - [α - amino(5-diethylamino-2-thienyl)acetamido]penicillanic acid,
6 - [α - amino(4-methylsulfonyl-2-thienyl)acetamido]penicillanic acid,
6 - [α - (3 - ethylthio-2-thienyl)acetamido]penicillanic acid, and
6 - [α - (4-cycloheptyloxy-2-thienyl)acetamido]penicillanic acid, respectively, which are isolated and found to contain the β-lactam ring as shown by infrared analysis and to inhibit *Staph. aureus* Smith at concentrations of 0.001% by weight.

EXAMPLE 8

*Preparation of 6-[(−)-α-amino(2-thienyl)-acetamido]penicillanic acid*

A mixture of 25 gms. (0.157 mole) of d,l-α-amino(2-thienyl)acetic acid and 43.6 gms. (0.188 mole) of d-10-camphorsulfonic acid in 250 ml. of acetone is heated to boiling to bring the solids into solution. The hot solution is filtered to remove any insoluble material, and the filtrate is cooled in an ice bath. The resulting crystalline precipitate is recovered by filtration, washed with acetone, and air-dried to give 27.2 gms. of the diastereoisomeric camphor sulfonate salt of the amino acid. This salt is suspended in a small amount of water, the pH is adjusted to 6.3 with concentrated $Na_4OH$, and the mixture is cooled in an ice bath. The crystalline product, (−)-α-amino(2-thienyl)acetic acid, is recovered by filtration, washed with water and acetone, recrystallized twice from isopropanol, and air-dried. It is found to weigh 4.5 gms., to melt with decomposition at 189–191° C., and to have an optical rotation of $[\alpha]_D^{23}=-73.7°$ (C=1.0% in water).

(−)-α-amino(2-thienyl)acetic acid (10 gms.; 0.063 mole) is dissolved in 75 mls. of water at 5° C. Carbobenzoxy chloride (12 gms.; 0.07 mole) is added, the mixture is stirred and a solution of NaOH (5.0 gms.) in 30 mls. of water is added. The mixture, which has a pH of 5, is stirred for 25 minutes, extracted twice with ether and acidified to pH 2 by the addition of $H_2SO_4$. The acid is then extracted with ether and the extract is washed with water and dried over magnesium sulfate to give a clear solution. The ether is evaporated and an oil is obtained which is slurried with Skellysolve B. Crystals are thereby formed which are collected by filtration. The product, (−)-α-carbobenzoxyamino(2-thienyl)acetic acid (13 gms.), is dried overnight in vacuo over $P_2O_5$. The product is determined to have a melting point of 85–86° C.

(−)-α-carbobenzoxy(2-thienyl)acetic acid (10 gms.; 0.344 mole), is dissolved in 100 mls. of dimethylformamide. There is then added 2,6-lutidine (3.7 gms.; 0.0244 mole) and the solution is cooled to 5° C. in an ice bath. Ethyl chloroformate (3.72 gms.; 0.0344 mole) is added to the cool solution over a period of five minutes. The mixture is stirred for 15 minutes and a solution of 6-aminopenicillanic acid (7.5 gms.; 0.395 mole) in 70 mls. of water and 20 mls. of 2,6-lutidine is added. The solution is stirred in the ice bath for 15 minutes, diluted with 500 mls. of water and extracted twice with ether. The ether extract is discarded. The pH of the solution is lowered to 2 by the addition of dilute $H_2SO_4$ and the product is extracted into ether. The ether extract is washed with water and the product is extracted into dilute $Na_2CO_3$. This extract has a pH of 7.5 and a volume of about 300 mls. It is then shaken with 7 gms. of 30% palladium on celite for 20 minutes under an atmosphere of hydrogen at a pressure of 50 p.s.i. The volume of the solution is doubled by the addition of water and the pH is lowered to 2 by the addition of dilute $H_2SO_4$. The catalyst is then removed by filtration and the filtrate is extracted with a mixture of 150 mls. of methyl isobutyl ketone and 8 gms. of aerosol O.T. The extract is dried over anyhdrous $Na_2SO_4$ and neutralized to pH 4.5 by the addition of triethylamine and an amorphous solid is collected by fitration and slurried with 20 mls. of water. A crystalline solid is formed which is collected and dried in vacuo over $P_2O_5$. The product, 6-[(−)-α-amino(2-thienyl)acetamido]-penicillanic acid, is found to weigh 1.9 gms., to contain the β-lactam structure as shown by infrared analysis, to have a rotation of $[\alpha]_D^{27}=+196°$ (C=0.5% in 0.1 N HCl), to inhibit *Staph. aureus* Smith at a concentration of 0.03 mcg./ml., to inhibit *Salmonella enteritidis* at a concentration of 0.25 mcg./ml., to exhibit versus *Klebsiella pneumoniae* a $CD_{50}$ of 14 mg./kg. and to exhibit versus *Salmonella enteritidis* a $CD_{50}$ of 2.4 mg./kg.

EXAMPLE 9

*Preparation of 6-[(−)-α-amino(3-thienyl)acetamido]pencilllanic acid*

To a solution of 11 gms. (0.068 mole) of (−)-α-(3-thienyl)glycine hydrochloride, which has a rotation of $[\alpha]_D^{23} = -92.7°$ (C=0.1% in water), and 8.2 gms. (0.21 mole) of sodium hydroxide in 80 mls. of water at 5° C., is added 12.8 gms. (0.075 mole) of carbobenzoxychloride. The mixture is stirred vigorously for two hours, extracted with ether, and the aqueous layer is separated, acidified to a pH of 2 with hydrochloric acid, and extracted with ethyl acetate. The organic layer is dried over anhydrous magnesium sulfate and evaporated under reduced pressure to give 13.8 gms. of (−)-N-carbobenzoxy-α-(3-thienyl)glycine which melts at 122–124° C.

Ethyl chloroformate (4.0 gms.; 0.037 mole) is added dropwise, over a period of five minutes, to a stirred mixture of 10.9 gms. (0.037 mole) of (−)-N-carbobenzoxy-α-(3-thienyl)glycine, 40 gms. (0.037 mole) of 2,6-lutidine, and 100 mls. of dimethylformamide at 5° C., and stirring is continued for an additional 15 minutes. A solution of 8 gms. (0.037 mole) of 6-aminopenicillanic acid in 75 ml. of water and 25 ml. of 2,6-lutidine, at 5° C., is added all at once. The mixture is stirred for 15 minutes, diluted with 300 ml. of water, and acidified to pH 2 with dilute surfuric acid. The penicillin is extracted with ether, washed with water, and then back extracted into 200 mls. of dilute aqueous sodium carbonate. A few drops of acetic acid are added to adjust the pH to 7. The mixture is hydrogenated at 50 pounds per square inch pressure, over a period of twenty minutes, at 25° C., using 7 gms. of 30% palladium on celite as the catalyst. The pH is lowered to 2 with dilute sulfuric acid and the catalyst is removed by filtration. The filtrate is extracted with a solution of 8 gms. of dioctyl sodium sulfocuccinate in 150 mls. of methyl isobutyl ketone, and the organic layer is separated and dried over anhydrous magnesium sulfate. The drying agent is removed by filtration, and the pH of the filtrate is adjusted to 4.5 by the addition of triethylamine. The solid product which forms is slurried with 5 mls. of water, and removed by filtration. It is recrystallized by dissolving in 10 ml. of water with enough ammonium hydroxide present to raise the pH to 8.5, and precipitating by adjusting the pH to 5 with acetic acid. The product, (−)-6-[α-amino(3-thienyl)acetamido]penicillanic acid, is collected by filtration and is found to weigh 750 mg., to melt with decomposition at 215° C., to inhibit *Staph. aureus* Smith at a concentration of 0.12 mcg./ml., to inhibit *Salmonella enteritidis* at a concentration of 0.025 mcg./ml., to exhibit versus *Salmonella enteritidis* a $CD_{50}$ of 13 mg./kg. and to exhibit versus *Klebsiella pneumoniae* a $CD_{50}$ of 45 mg./kg.

EXAMPLE 10

*Preparation of d,l-6-[α-amino-(3-thienyl)acetamido]penicillanic acid*

α-(3-thienyl)glycine (4.8 gms.; 0.03 mole) is suspended in 55 mls. of methylene chloride and cooled to −10° C. Phosphorus pentachloride (9.4 gms.; 0.045 mole) is added in one portion. The mixture is stirred for 45 minutes at from −10 to −5° C., 10 drops of dimethylformamide are added and stirring is continued for an additional 45 minutes. The mixture is then filtered and the filter cake is washed twice with methylene chloride and dried in vacuo over $P_2O_5$. The weight of the product is 3.9 gms. which represents a 60% yield.

The pH of a solution of 6-aminopenicillanic acid (2.6 gms.; 0.012 mole) in 50 mls. of water is adjusted to 7 by the addition of a 10% by weight aqueous solution of NaOH. The solution is then diluted with 200 mls. of acetone and cooled to 7° C. The pH of the solution is then adjusted to 3 by the addition of 6 N HCl. To this solution is added d,l-α-(3-thienyl)glycyl chloride hydrochloride prepared as above (3.8 gms.; 0.018 mole) over a ten-minute period, the pH being kept at 3 to 3.5 by the intermittent addition of 10% NaOH. The mixture is stirred at 5 to 10° C. for 15 minutes and the pH is adjusted to 7 by the addition of 10% NaOH. The mixture is then filtered and the acetone is removed in vacuo from the filtrate at 37° C. The filtrate is then acidified to pH 2 by the addition of 20% $H_2SO_4$ and extracted twice with methyl isobutyl ketone. The extract is dried over anhydrous sodium sulfate and neutralized to pH 6.5 by the addition of triethylamine. The gummy precipitates which are obtained are combined and triturated with acetone to give a yellowish solid. This solid is collected by filtration, washed with ether and dried in vacuo over $P_2O_5$ to yield 0.9 gm. of product which represents a 22% yield. The product, d,l-6-[α-amino(3-thienyl)acetamido]penicillanic acid, is found to have a melting point of from 177 to 180° C. with decomposition, to contain the β-lactam structure as shown by infrared analysis and to inhibit *Staph. aureus* Smith at a concentration of 0.4 mg./ml. and to exhibit versus *Staph. aureus* Smith a $CD_{50}$ of 3.8 mg./kg.

While various embodiments have been described in some detail it will be understood that modifications can be made in the procedures described without departing from the scope of the invention. Certain agents, compounds, or mixtures (e.g. acids, bases, solvents and the like), and other details described or equivalent to those described in relation to one procedure may be employed in connection with other procedures.

We claim:

1. A method for the treatment of bacterial infections which comprises administering to the infected host a nontoxic, therapeutically effective amount of 6-[(−)-α-amino(2-thienyl)acetamido]penicillanic acid or a nontoxic, pharmaceutically acceptable salt thereof.

2. A method for the treatment of bacterial infections which comprises administering to the infected host a nontoxic, therapeutically effective amount of 6-[(−)-α-amino(3-thienyl)acetamido]penicillanic acid or a nontoxic, pharmaceutically acceptable salt thereof.

3. A pharmaceutical composition is dosage unit form for the treatment of bacterial infections comprising a pharmaceutical carrier and a nontoxic, therapeutically effective amount of the compound 6-[(−)-α-amino-(3-thienyl)acetamido]penicillanic acid or a nontoxic, pharmaceutically acceptable salt thereof.

4. A pharmaceutical composition in dosage unit form for the treatment of bacterial infections comprising a pharmaceutical carrier and a nontoxic, therapeutically effective amount of the compound 6-[(−)-α-amino-(2-thienyl)acetamido]penicillanic acid or a nontoxic, pharmaceutically acceptable salt thereof.

References Cited

UNITED STATES PATENTS 3,080,356  3/1963  Catlin et al. _____ 260—239.1

LEWIS GOTTS, *Primary Examiner.*

SHEP K. ROSE, *Assistant Examiner.*